United States Patent
Dang (10) Patent No.: US 8,755,141 B1
(45) Date of Patent: *Jun. 17, 2014

(54) HARD DISK DRIVE ASSEMBLY INCLUDING A NVSM LOCATED WITHIN A PREAMPLIFIER TO STORE CONFIGURATION DATA FOR CONTROLLING DISK DRIVE OPERATIONS

(75) Inventor: Dean V. Dang, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 17 days.

This patent is subject to a terminal disclaimer.

(21) Appl. No.: 13/465,672

(22) Filed: May 7, 2012

(51) Int. Cl.
*G11B 5/02* (2006.01)

(52) U.S. Cl.
USPC ............................................................ 360/55

(58) Field of Classification Search
None
See application file for complete search history.

(56) References Cited

U.S. PATENT DOCUMENTS

| | | | |
|---|---|---|---|
| 6,057,981 A | 5/2000 | Fish et al. | |
| 6,618,930 B1 | 9/2003 | Fish et al. | |
| 2001/0043419 A1* | 11/2001 | Osaki | 360/55 |
| 2009/0257142 A1* | 10/2009 | Sevvom | 360/31 |
| 2010/0246048 A1* | 9/2010 | Ranmuthu | 360/68 |
| 2012/0262812 A1* | 10/2012 | McGuire et al. | 360/31 |

OTHER PUBLICATIONS

Office Action dated Sep. 19, 2013 from U.S. Appl. No. 13/465,716, 13 pages.

* cited by examiner

*Primary Examiner* — Thang Tran (57) ABSTRACT

Disclosed is a disk drive that is operable with a host computer that includes a printed circuit board assembly (PCBA) having a system on a chip (SOC). The disk drive comprises: a hard disk drive assembly (HDA); and a non-volatile semiconductor memory (NVSM). The NVSM is located within a preamplifier of the HDA and is couplable to the SOC of the host computer. The NVSM is configured to store configuration data for disk drive operation. The configuration data is configured to be retrieved by the SOC for controlling disk drive operations.

18 Claims, 5 Drawing Sheets

HARD DISK DRIVE ASSEMBLY INCLUDING A NVSM LOCATED WITHIN A PREAMPLIFIER TO STORE CONFIGURATION DATA FOR CONTROLLING DISK DRIVE OPERATIONS

BACKGROUND

Today, computing devices such as personal computers, laptop computers, personal digital assistants, mobile devices, tablets, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive. A huge market exists for disk drives for computing devices such as laptop computers, desktop computers, mobile computers, mobile devices, server computers, etc.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track. Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel.

To be competitive in the disk drive market, a disk drive should be relatively inexpensive and should embody a design that is adaptive for low-cost mass production, while at the same time provide high data storage capacity, provide rapid access to data, and meet ever decreasing size requirements. Satisfying these competing restraints of low-cost, high data storage capacity, rapid access to data, and decreasing size, requires innovation in each of the numerous components of the disk drive and the methods of assembly.

As an example, many laptop computer and mobile device developers are requiring that disk drives be of decreased size to meet customer demands for thin, light weight, and very portable computing devices. Disk drive manufacturers currently manufacture both the mechanical/electro-mechanical components associated with the disk drive (e.g., the disks, the heads, the actuator arms, etc., often termed the hard disk drive assembly (HDA)), as well as the computing components (e.g., the processor, the servo controller, the read/write channel, etc.) as part of a printed circuit board assembly (PCBA), that is attached to the HDA create the complete disk drive. The complete disk drive is then sent onto the computing device developer for assembly with their computing device.

DETAILED DESCRIPTION

Figure 1:
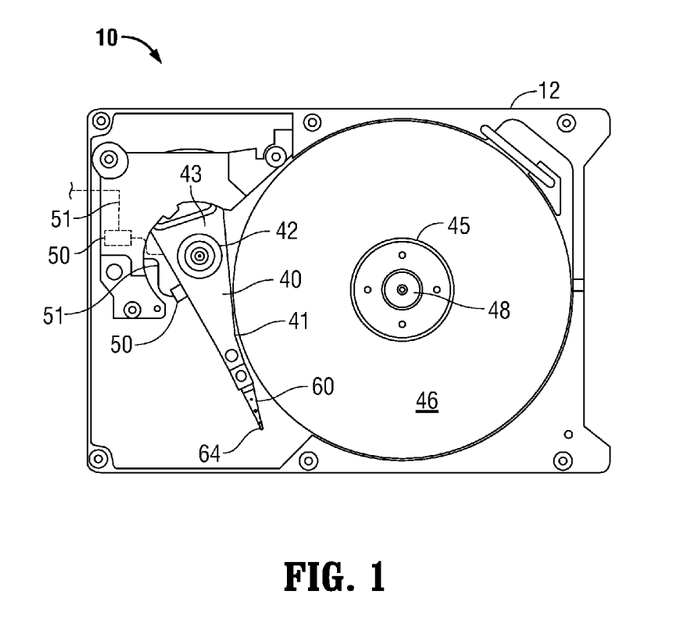
FIG. 1 shows a diagram of a hard disk drive assembly (HDA) that may be utilized to incorporate embodiments of the invention.

With reference to FIG. 1, FIG. 1 shows a hard disk drive assembly (HDA) 10 of a disk drive that may be utilized to incorporate embodiments of the invention. HDA 10 may include a disk drive base 12. At least one disk 46 may be rotatably mounted to the disk drive base 12 via spindle motor 45. A head stack assembly (HSA) 40 may be rotatably mounted to the disk drive base 12 via an actuator pivot 42. The HSA 40 may include an actuator body 43 from which a plurality of actuator arms 41 extend. At least one head gimbal assembly (HGA) 60 may be mounted to the distal end of at least one of the actuator arms 41 and each HGA 60 may include a head 64. The opposite end of each of the plurality of actuator arms 41 is a supported end adjoining the actuator body 43.

Figure 2:
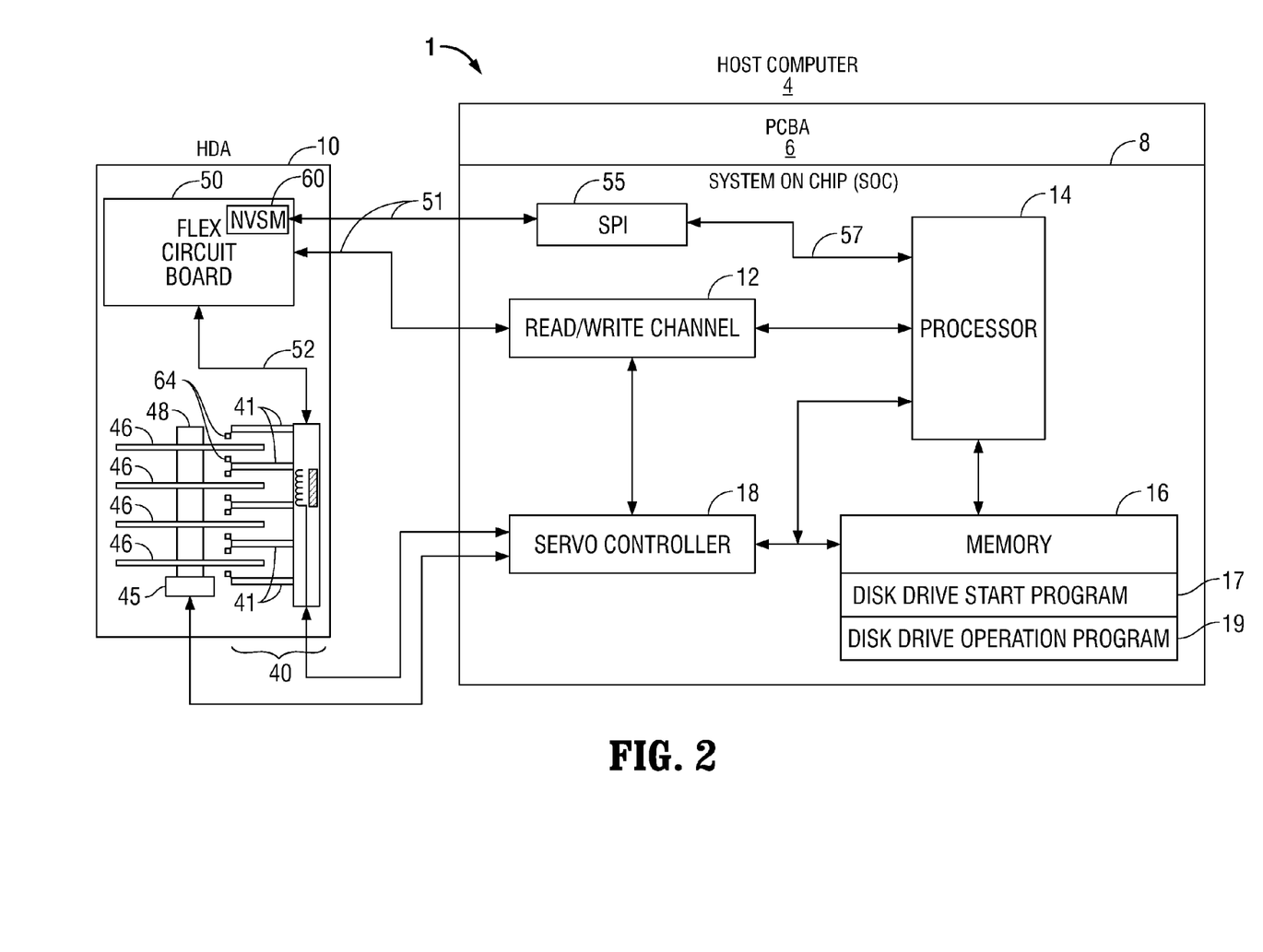
FIG. 2 shows a simplified diagram of a disk drive that includes the HDA coupled to a host computer that includes a printed circuit board assembly (PCBA), according to one embodiment of the invention.

With additional reference to FIG. 2, FIG. 2 shows a simplified block diagram of a disk drive 1 that includes HDA 10 coupled to a host computer 4 that includes a printed circuit board assembly (PCBA) 6, according to one embodiment of the invention. PCBA 6 of host computer 4 may include a system on a chip (SOC) 8 that includes typical PCBA components associated with disk drive operation such as a read/write channel 12, a processor 14, a memory 16, and a servo controller 18, as will be described in more detail. In this way, host computer 4 may include typical PCBA components associated with a disk drive and may operate in cooperation with HDA 10 to enable the operation of a complete disk drive 1, as will be described.

HDA 10 may comprise: a plurality of disks 46 for data storage; a spindle motor 45 for rapidly spinning each disk 46 on a spindle 48; and head stack assembly (HSA) 40 including a voice coil motor (VCM) for moving the plurality of actuator arms 41 and heads 64 over disks 46. As is known, each of the disks 46 may have a plurality of tracks defined by a plurality of embedded servo sectors. Each servo sector may include head positioning information such as a track address for course positioning during seeks and servo bursts for fine positioning while tracking the centerline of a target track during write/read operations. Further, each of the tracks may include data sectors between each of the servo sectors for data storage. The heads 64 via head wire(s) 52 may be connected to a flex circuit board 50 that includes a preamplifier to aid in reading and writing data to and from disks 46. Flex circuit board 50 may be connected to read/write channel circuitry 12 in the SOC 8 of host computer 4 via a flex circuit cable 51 to enable reading and writing data to and from the disks 46 under the control of SOC 8.

As can be particularly seen in FIG. 1, in one example, flex circuit board 50 may be mounted to the actuator body 43 or to a side of an actuator arm 41. The flex circuit board 50 may be connected to the heads 64 via head wires. As another example, flex circuit board 50 may be mounted to a base portion 12 of the HDA 10 closer to the entrance of the flex circuit cable 51 from the host computer 4 and to the heads 64 via head wires (e.g., see dashed lines). It should be appreciated that the flex circuit board 50 may be mounted at any suitable location of the HDA 10 dependent upon design considerations.

As can be particularly seen in FIG. 2, the SOC 8 of host computer 4 may comprise a read/write channel 12, a processor 14, a memory 16, and a servo controller 18, all of which may be used to control disk drive operations. Normal disk drive operations for reading/writing data, seeking/searching, etc., for disk drive 1, may be executed under the control of processor 14 connected to the read/write channel 12, servo controller 18, and memory 16. These types of operations may be implemented by the PCBA 8 of host computer 4 during normal disk drive operations. For example, program code executed by processor 14 may be stored in memory 16 (e.g., non-volatile memory, random access memory (RAM), etc.). As will be described in more detail, a disk drive start program 17 may be utilized for start-up or power-up of disk drive 1 and a disk drive operation program 19 may be utilized for normal disk drive operations both of which may be loaded into memory 16 for execution by processor 14. Program overlay code stored on reserved tracks of a disk(s) may also be loaded into memory 16 as required for execution.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10. Read/write data may be transmitted via flex circuit cable 51 to flex circuit board 50 and from flex circuit board 50 via head wires 52 to heads 64 for reading and writing data to and from disks 46. SOC circuitry 8 may process a read signal emanating from a head 64 to demodulate the servo sectors into a position error signal (PES). The PES may be filtered with a suitable compensation filter to generate a control signal applied through the servo controller 18 to the VCM which rotates an actuator arm 41 of the actuator assembly 40 about a pivot in a direction that reduces the PES. Further, processor 14 may operate as a disk controller for formatting and providing error detection and correction of disk data, a host interface controller for responding to commands from host computer 4, and as a buffer controller for storing data which is transferred between disks 46 and host computer 4.

Servo controller 18 provides an interface between processor 14 and HDA 10. Processor 14 may command logic in servo controller 18 to position actuator arms 41 and heads 64 using the VCM driver of the actuator assembly 40 and to precisely control the rotation of a spindle motor to spin the disks 46. Disk drive 1 may employ a sampled servo system in which equally spaced servo sectors are recorded on each track of each disk 46. Data sectors may be recorded in the intervals between the servo sectors on each track. Servo sectors may be sampled at regular intervals by servo controller 18 to provide servo position information to processor 14. Servo sectors may be received by read/write channel 12 and are processed by servo controller 18 to provide position information to processor 14. It should be appreciated that this is a simplified description of a disk drive 1 and that many different types of disk drive implementations may be implemented in accordance with embodiments of the invention.

According to one embodiment of the invention, a disk drive 1 is provided that is operable with a host computer 4 in which the host computer 4 includes the PCBA 6. As previously described, PCBA 6 includes a SOC 8 that is operable on the host computer 4 and that includes all of the typical electronic components of a PCBA that are typically mounted within the disk drive itself—including a read/write channel 12, a processor 14, a memory 16, and servo controller 18—for conducting normal disk drive operations. In this way, the HDA 10 is mounted or coupled to the host computer 4 and the host computer includes the PCBA 6 circuitry. It should be appreciated that the host computer 4 may be any type computing device (e.g., laptop computer, desktop computer, server computer, mobile computer, mobile device, etc.). However, it should be appreciated that when the host computer 4 is a smaller/portable type of computing device (e.g., laptop computer, mobile device, etc.), that by simply attaching the HDA 10 to the host computing device 4 that already includes the PCBA 6 functionality, that this enhances the thinness of the portable computing device and lowers the weight of the portable computing device.

In one embodiment, disk drive 1 includes HDA 10 and a non-volatile semiconductor memory (NVSM) 60 that is located in the HDA 10. The NVSM 60 located in the HDA 10 may be coupled to the processor 14 of the SOC 8 of the host computer 4 by flex circuit cable 51 which couples to a serial peripheral interface (SPI) 55 of SOC 8 that is coupled to the processor 14 of SOC 8 by link 57. NVSM 60 may be configured to store configuration data for disk drive operations. In particular, the configuration data may be configured to be retrieved by the SOC 8 for controlling disk drive operations, as will be described. As an example, the NVSM may include a flash memory. However, it should be noted that the term non-volatile semiconductor memory (NVSM) may refer to any type of non-volatile memory or non-volatile storage that may be a type of memory that retains stored information even when it is not powered. Example of non-volatile memory may include read-only memory, flash memory, ferroelectric RAM (F-RAM) as well as other types of non-volatile memory.

Figure 3:
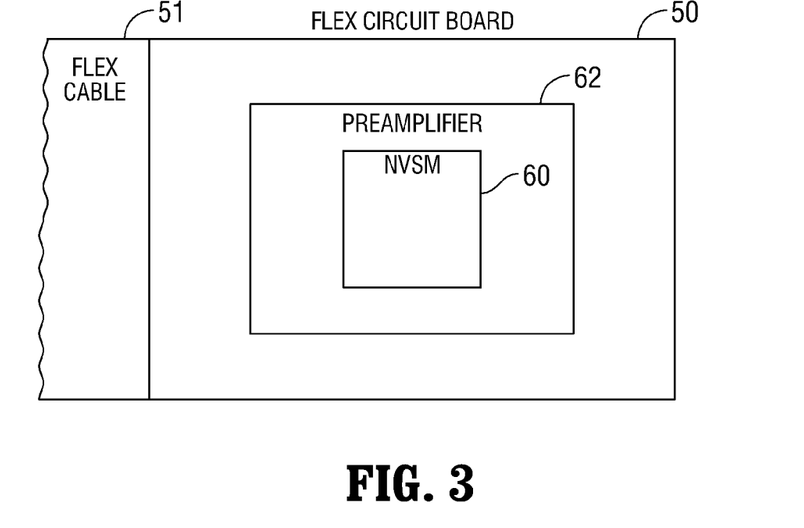
FIG. 3 shows a simplified diagram of a flex circuit cable coupled to a flex circuit board including a preamplifier and a non-volatile semiconductor memory (NVSM), according to one embodiment of the invention.

As previously described, HDA 10 may include a flex circuit cable 51 coupled to a flex circuit board 50 that is coupled through head wires 52 to aid in communicating read/write data between heads 64 and PCBA 6. With brief additional reference to FIG. 3, flex circuit cable 51 may be coupled to flex circuit board 50 and flex circuit board 50 may include a preamplifier 62. Preamplifier 62 may operate to transfer data to and from disks 46 by generating write currents that are passed on by head wires 52 through heads 64 during write operations and by detecting and amplifying read signals received by heads 64 during read operations. As one example, NVSM 60 may be located within the preamplifier 62 of the flex circuit board 50. However, NVSM 60 may also be located within and/or coupled to at least one of the flex circuit cable 51, the flex circuit board 50, or the preamplifier 62, or any combination thereof. Further, it should be appreciated that NVSM 60 may be located at any suitable location within HDA 10. As previously described with reference to FIG. 1, flex circuit board 50 including NVSM 60 may be mounted to the actuator body 43, a side of an actuator arm 41, or to any suitable location of the HDA 10 dependent upon design considerations. For example, it may be beneficial to mount the flex circuit board 50 including NVSM 60 in the HDA 10 at location close to the PCBA 6 of the host computer 4 via flex circuit cable 51 (e.g., see dashed lines of FIG. 1).

Figure 4:
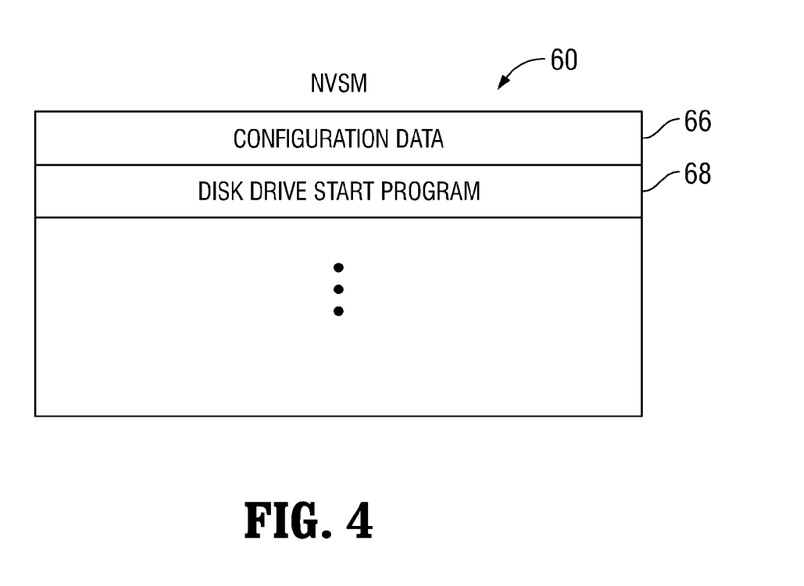
FIG. 4 shows a simplified diagram of the NVSM including configuration data and a disk drive start program, according to one embodiment of the invention.

With brief additional reference to FIG. 4, in one embodiment, NVSM 60 may include configuration data 66 and a disk drive start program 68. As an example, the disk drive start program 68 may be a firmware program. Further, NVSM 60 may store other data and programs as well. Also, with brief additional reference to FIG. 5, in one embodiment, configuration data 66 may include a plurality of different types of configuration data entries. For example, configuration data 66 may include: the type of disk drive family 72, the disk drive serial number 74, the type of head and the number of heads 76, the type of disk and the number of disks 78, servo information 80, microjog information 82, track information 84, calibration information 86, etc. It should be appreciated that a wide variety of different types of configuration data may be stored in the NVSM 60 and that these are just examples. As will be described, the SOC 8 of the host computer 4 may be configured to retrieve the configuration data 66 from the NVSM 60 and based upon the configuration data may control disk drive operations.

As an example, in operation, to start-up up the disk drive 1, the processor 14 of SOC 8 of the host computer 4 may retrieve the configuration data 66 and the disk drive start program 68 from the NVSM 60 of the HDA 10 through flex circuit cable 51 coupled to SPI 55 of SOC 8 and via link 57 coupled to processor 14. The SOC 8 of the host computer 4 may store the disk drive start program 17 in memory 16 such that processor 14 of the SOC 8 under control of the disk drive start program 17 may start-up disk drive 1. After disk drive 1 is started-up, SOC 8 of the host computer 4 may perform normal disk drive operations under disk drive operation program 19 also received from the HDA 10. These operations will be discussed in more detail hereinafter.

Figure 5:
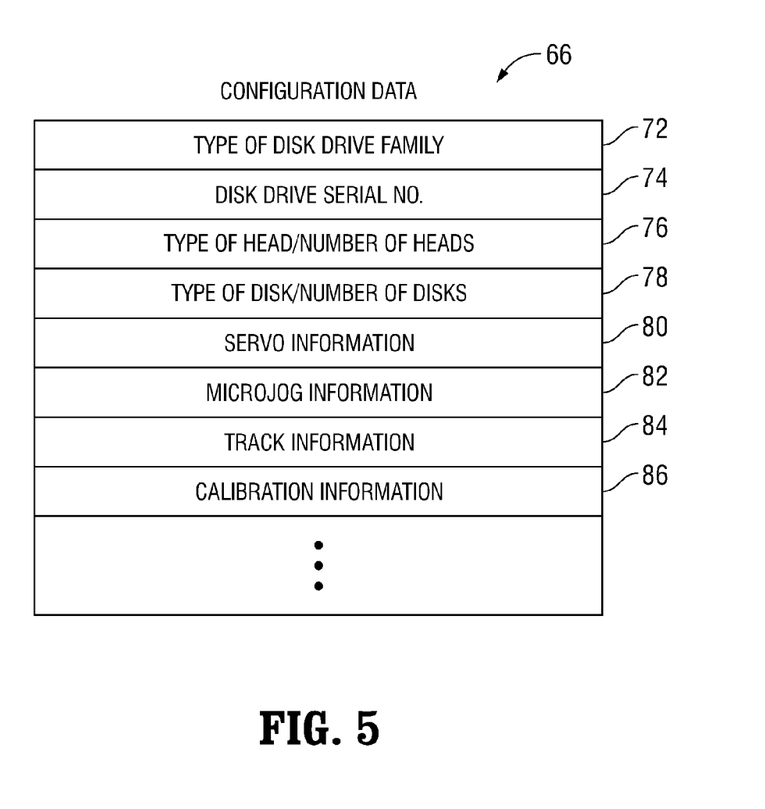
FIG. 5 shows a table of configuration data, according to one embodiment of the invention.

In starting-up disk drive 1, the disk drive start program 17 under the control of processor 14 of the SOC 8 of the host computer 4 may read and utilize configuration data 66 stored in the NVSM 60. For example, servo data 80 related to servo gain, servo detection thresholds, etc., may be utilized by servo controller 18 to synch-up the servo controller 18. Microjog information 82 may be utilized to account for the distances between the read and write heads. Track information 84 may be utilized to determine the number of tracks on the disk and the location of the disk drive operation program 19 stored at reserved tracks. Calibration information 86 related to preamplifier gains for heads, temperature data related to start-up, write current magnitudes, etc., may be utilized to aid the disk drive start program 17 in starting-up the disk drive 1. Further, a wide variety of other types of configuration data 66 may be utilized by the disk drive start program 17 to start-up the disk drive 1 such as: the type of disk drive family 72, the disk drive serial number 74, the type of head and the number of heads 76, the type of disk and the number of disks 78, etc. It should be appreciated that the use of calibration information to start-up a disk drive itself is known.

However, according to embodiments of the invention, an HDA 10 is manufactured that includes a NVSM 60 that stores both configuration data 66 and a disk drive start program 68 that may be read and implemented by the PCBA 6 of a host computer 4. In this way, a host computer 4 may read and implement the disk drive start program 68 stored at the HDA 10 based upon configuration data 66 also stored by HDA 10 to start-up the disk drive.

As an example, in operation, after the host computer 4 is turned on, disk drive 1 may be started-up. As part of the start-up process, the disk drive start program 68 is read from the NVSM 60 and stored in memory 16 of the SOC 8 as disk drive start program 17 and is implemented by processor 14 of the SOC 8. Further, configuration data 66 may be read from the NVSM 60 by the SOC 8 of the host computer 4 to aid processor 14 in implementing the disk drive start program 17 to start-up the disk drive. For example, in the disk drive start-up: the spindle motor 45 may be spun up and disks 46 sped up to a pre-determined rotational speed; the actuator 40 may rotate the arms 41 such that the heads 64 are loaded out over the surfaces of the disks 46; and servo controller 18 may be synchronized such that the heads are synchronized to read the disk media. All of this may be based on the configuration data 66 and the disk drive start program 68 retrieved by the SOC 8 of the host computer 4 from the NVSM 60 stored on the HDA 10 itself.

Further, after start-up, the disk drive operation program 19 is read from a reserved track area of one or more of the disks 46 and loaded into memory 16 of the SOC 8 of the host computer 4 such that the processor 14 of the PCBA 6 of the host computer 4 can implement normal disk drive operations. Disk drive operation program 19 may be stored as a firmware program in a reserved track area of one or more of the disks 46. However, it should be appreciated that disk drive operation program 19 may also be stored in flash memory or in another type of memory of the HDA 10.

Figure 6:
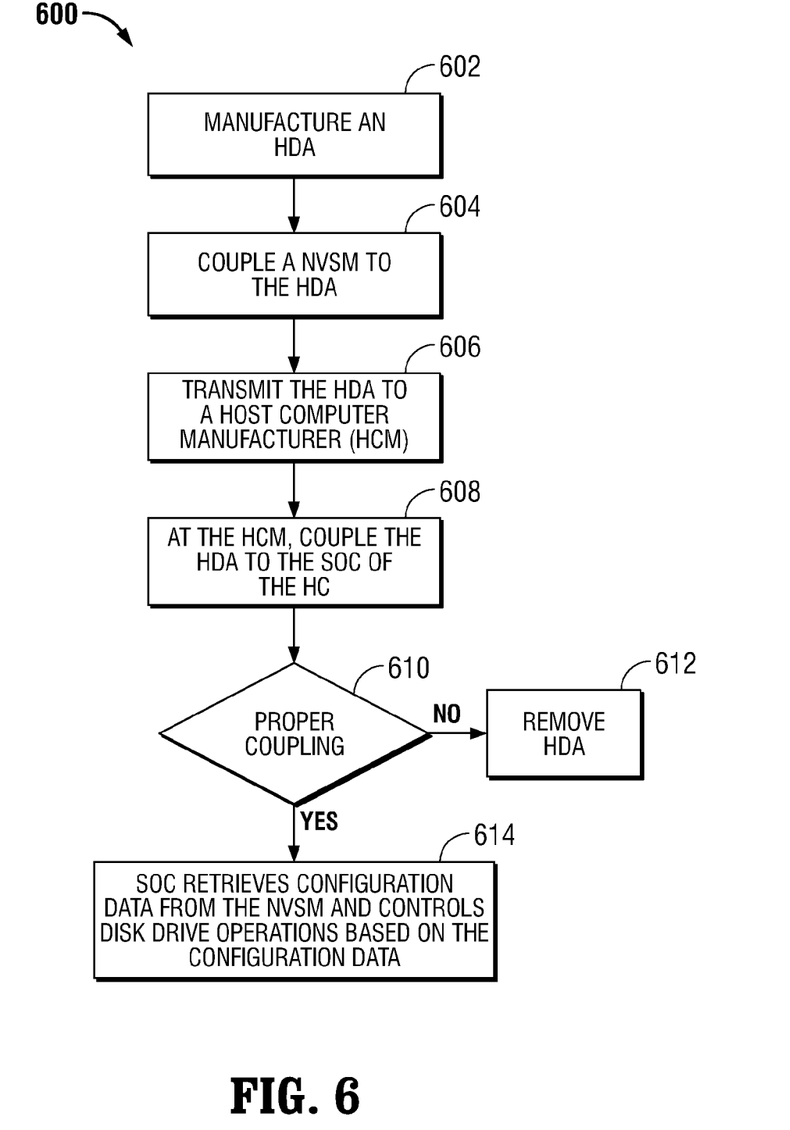
FIG. 6 is a flow diagram illustrating a process of manufacturing a disk drive in which the disk drive is operational with a host computer that itself includes a PCBA, according to one embodiment of the invention.

With additional reference to FIG. 6, FIG. 6 is a flow diagram illustrating a process 600 of manufacturing a disk drive in which the disk drive is operational with a host computer that itself includes a PCBA. For example, the PCBA may include a SOC 8 having a read/write channel 12, a processor 14, a memory 16, and a servo controller 18 to implement both disk drive start-up and normal disk drive operations, as previously described.

In one embodiment, process 600 includes manufacturing a HDA (block 602). As previously described, an HDA 10 may be manufactured that includes coupling a NVSM 60 to a portion of the HDA itself (block 604). As previously described examples, the NVSM 60 may be located within or coupled to at least one of a flex circuit cable 51, a flex circuit board 50, or a preamplifier 62, and/or combinations thereof. Also, the NVSM 60 may be a flash memory and may be configured to store configuration data 66 and a disk drive start program 68 to enable disk drive start-up by the PCBA of the host computer.

Next, the HDA 10 is transmitted to a host computer manufacturer (HCM) (block 606). At the HCM, the HDA 10 may be coupled to the SOC 8 of the host computer 4 (block 608), where it can be tested to see if proper coupling (decision block 610) has occurred. If proper coupling does not occur such that the HDA 10 does not interface correctly with the host computer 4 for disk drive operations then the HDA 10 is removed (block 612). It should be appreciated that properly coupling may refer to the HDA 10 properly connecting physically to the host computer 4 and properly starting-up and properly performing normal disk drive operation tests with the host computer 4 to make sure the disk drive correctly interfaces with the host computer.

On the other hand, when proper coupling occurs, the SOC 8 of the host computer 4 retrieves the configuration data 66 from the NVSM 60 of the HDA 10 and controls disk drive operations based on the configuration data (block 614). In particular, when proper coupling occurs, the SOC 8 of the host computer 4 retrieves the configuration data 66 from the NVSM 60 and the disk drive start program 68 from the NVSM 60 and properly starts-up the disk drive by implementing the disk drive start program 17 by the SOC 8 of the host computer 4, as previously described. After successful start-up, the disk drive operation program may be read from a reserved track section of one of the disks and stored as disk drive operation program 19 and may be implemented by processor 14 of the SOC 8 of the host computer 4 to perform normal disk drive operations. In particular, disk drive 1 may be tested to ensure that it operates properly. If disk drive 1 passes testing, an optimization process may be run to optimize the disk drive's performance with the host computer 4.

In this way, an HDA 10 may be manufactured and sent to a host computer manufacturer where it is connected to the host computer 4 and tested. The host computer manufacturer can simply attach the HDA 10 to the host computer 4 and perform start-up and testing to see if the disk drive 1 operates correctly. The disk drive start up program 68 and configuration data 66 are already conveniently stored in the NVSM 60 of the HDA 10 itself (along with the disk operation program already stored on disk) such that the PCBA 6 of the host computer 4 can start-up, test, and optimize the disk drive 1 for operation with the host computer 4.

Because the corresponding PCBA 6 is already present in the circuitry of the host computer 4, the HDA 10 is simply attached to the host computer and connected to the existing PCBA 6 by the host computer manufacturer. This allows for the host computer 4 to be manufactured in a thinner and lighter weight fashion and at a lower cost. This may be beneficial for laptop computers and mobile computing devices that seek further thinness and lighter weight to enhance portability. Further, disk drive manufacturers only have to develop the mechanical/electro-mechanical components of the HDA 10 associated with the disk drive (e.g., the disks, the heads, the actuator arms, etc.), whereas the PCBA functionality may be implemented within the circuitry of the computing device itself, thereby reducing the overall cost of the development of the disk drive as well as the host computer itself.

It should be appreciated that host computer 4 may be any type of computing device, such as, a desktop computer, a laptop computer, a mobile computer, a mobile device, a sever computer, etc. It should be appreciated that host computer 4 may operate under the control of programs, firmware, or routines to execute the methods or processes in accordance with the embodiments of the invention, previously described. Further, it should be appreciated that embodiments of the invention may relate to various types of disk drives and HDAs 10 having various numbers of heads, disks, and storage capability.

For purposes of the present specification, it should be appreciated that the terms "system on chip," "printed circuit board assembly," "processor," "read/write channel," "servo controller," etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a subprogram, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously may be employed by a disk drive that includes a hard disk drive assembly (HDA) having a non-volatile semiconductor memory (NVSM) located in the HDA to store configuration data. However, it should be appreciated, that other types of data storage devices with similar or other media format characteristics may be utilize aspects of the invention.

What is claimed is:

1. A hard disk drive assembly (HDA) that is operable with a host computer that comprises a printed circuit board assembly (PCBA) including a system on a chip (SOC), the HDA comprising:
    a plurality of disks configured to store data;
    a plurality of heads configured to read and write data stored on the plurality of disks;
    a preamplifier configured to couple to the plurality of heads and the SOC of the host computer; and
    a non-volatile semiconductor memory (NVSM) located within the preamplifier, the NVSM configured to store configuration data for read and write operations of the HDA, wherein the configuration data is to be retrieved by the SOC for controlling the read and write operations of the HDA.

2. The (HDA) of claim 1, wherein the NVSM comprises flash memory.

3. The (HDA) of claim 1, wherein the SOC is configured to retrieve the configuration data from the NVSM and to control the read and write operations of the HDA based upon the configuration data.

4. The (HDA) of claim 1, wherein the SOC comprises a processor and the NVSM stores a disk drive start program such that the processor under the control of the disk drive start program controls the read and write operations of the HDA.

5. The (HDA) of claim 4, wherein the start program comprises firmware.

6. The (HDA) of claim 4, wherein the SOC further comprises a read/write channel and a servo controller.

7. The (HDA) of claim 1, wherein the configuration data comprises data indicating at least one of a type of family or a serial number.

8. The (HDA) of claim 1, wherein the configuration data comprises data indicating at least one of a type of head or a type of disk.

9. The (HDA) of claim 1, wherein the configuration data comprises at least one of: servo information, microjog information, track information, or calibration information.

10. A method of manufacturing a hard disk drive assembly (HDA), wherein the HDA is operable with a host computer that comprises a printed circuit board assembly (PCBA) including a system on a chip (SOC), the method comprising:
    manufacturing a hard disk drive assembly (HDA) comprising a plurality of disks configured to store data, a plurality of heads configured to read and write data stored on the plurality of disks, a preamplifier configured to couple to the plurality of heads and the SOC of the host computer, and a non-volatile semiconductor memory (NVSM) located within the preamplifier; and
    coupling the NVSM with the preamplifier of the HDA, wherein the NVSM is configured to store configuration data for read and write operations of the HDA, and wherein the configuration data is to be retrieved by the SOC on the host computer such that during the read and write operations of the HDA, the SOC uses the configuration data to control the read and write operations of the HDA.

11. The method of claim 10 further comprising coupling the HDA to the SOC of the host computer wherein, upon start-up, the SOC is configured to retrieve the configuration data from the NVSM and to control disk drive operations based upon the configuration data.

12. The method of claim 10, wherein the NVSM comprises flash memory.

13. The method of claim 10, wherein the SOC comprises a processor and the NVSM stores a disk drive start program such that the processor under the control of the disk drive start program controls the read and write operations of the HDA.

14. The method of claim 13, wherein the disk drive start program comprises firmware.

15. The method of claim 13, wherein the SOC further comprises a read/write channel and a servo controller.

16. The method of claim 10, wherein the configuration data comprises data indicating at least one of a type of disk drive family or a disk drive serial number.

17. The method of claim 10, wherein the configuration data comprises data indicating at least one of a type of head or a type of disk.

18. The method of claim 10, wherein the configuration data comprises at least one of: servo information, microjog information, track information, or calibration information.

* * * * *